W. SMITH.
Fly-Trap.

No. 210,562.        Patented Dec. 3, 1878.

WITNESSES:
W. W. Hollingsworth
Colon C. Kernon

INVENTOR:
Wm. Smith
BY
ATTORNEYS.

N. PETERS, PHOTO-LITHOGRAPHER, WASHINGTON, D. C.

UNITED STATES PATENT OFFICE.

WILLIAM SMITH, OF CARMI, ILLINOIS.

IMPROVEMENT IN FLY-TRAPS.

Specification forming part of Letters Patent No. 210,562, dated December 3, 1878; application filed September 11, 1878.

*To all whom it may concern:*

Be it known that I, WILLIAM SMITH, of Carmi, in the county of White and State of Illinois, have invented a new and useful Improvement in Fly-Traps; and I do hereby declare that the following is a full, clear, and exact description of the same.

The object of my invention is to provide an improved means for entrapping flies; and to this end I combine an alarm mechanism with a bait-holder and wire-gauze cone or other form of prison-receptacle for flies. The alarm mechanism is operated intermittently, but at regular intervals, and serves to frighten the flies that have collected around the bait, causing them to ascend and pass into the double cone or prison-chamber, from which they cannot escape.

The alarm consists of a clock-train, a peculiar let-off and striking mechanism, and an agitator or vibrating wheel, located in such relation to the prison cone or chamber that when said agitator is vibrated by the blows of the hammer of the clock-train it will frighten or drive the flies from the bait, and thus prevent their seeking escape by the way through which they entered.

Figure 1:
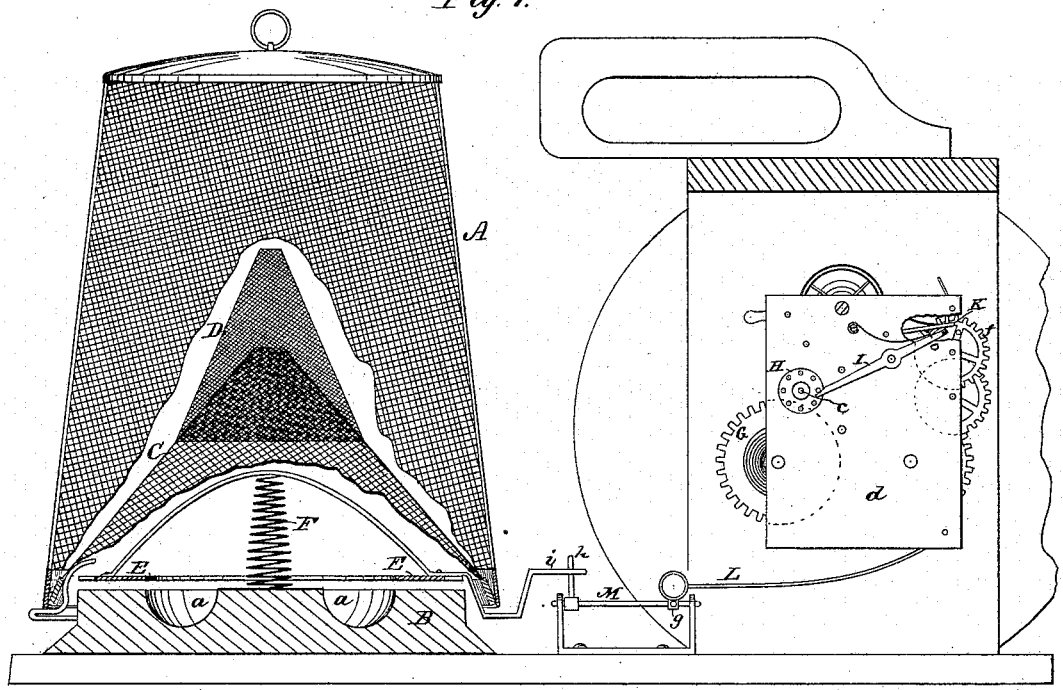
Figure 2:
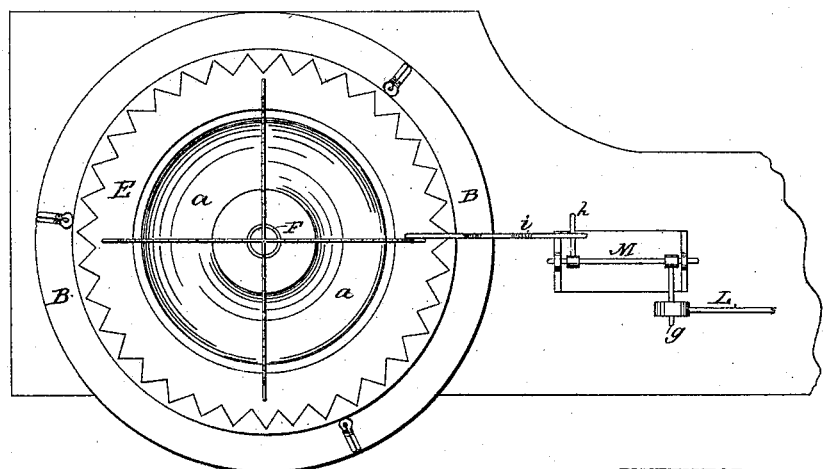

In the accompanying drawing, forming part of this specification, Figure 1 is a side elevation, with the outer fly-receptacle broken away. Fig. 2 is a plan view of the lower portion of the fly-receptacle.

A indicates the prison-chamber, which is a wire-gauze receptacle having the form of a truncated cone. It is set on a recessed bait-holder, B, of ordinary construction, and is provided with two inner cones, C D. The lower one, C, of said inner cones is of the same diameter as the receptacle A, while the upper cone, D, is much narrower and more tapered. The two cones C D are rigidly connected, but are detachable from the receptacle A. The lower cone, C, has a number of openings at or around its apex, while the upper cone, D, has but a single aperture. The flies ascending in the lower cone, C, pass through the openings in its top, and thence through the cone D into the chamber A. The taper of the upper cone, D, and the fact that it is of closer mesh than the lower cone, C, prevent the flies seeking to escape or to return through it, as they tend to do through cone C, whose coarse mesh offers less obstruction to the light and enables the flies to perceive the bait located below.

In the space between the recess $a$ of the bait-holder B and the side of the receptacle A is located the agitator E. The same may have various forms and supports; but, as shown, it is a notched annular sheet-metal plate attached to and supported by a spring, F, rising from the center of the bait-holder. The spring yields readily in any direction, so that if the annulus E receives a blow or is pushed and suddenly released it will vibrate or quiver more or less rapidly and violently, and by such movement frighten the flies which have collected around the bait in recess $a$, causing them to seek escape through cones C D into chamber A.

I will now proceed to describe the means which, taken together with the said agitator E, constitute the alarm mechanism.

The clock-train G may be of the ordinary construction as to its principal parts. The new parts and their operation are as follows: The shaft $c$ of the third wheel of the time-train is extended beyond the back plate, $d$, and on it is mounted a pinion or lantern wheel, H. A trip lever or trigger, I, is pivoted to the back plate, $d$, so that its lower end will engage the teeth of the pinion H, while its bent upper end will, at regular intervals of time, raise the spring-dog K out of engagement with the lug on the fourth or "warn" wheel $f$ of the striking-train. Thus each time the pinion H rotates through a space equal to the distance between two of its teeth the end of the lever I is pressed downward, which causes its upper end to elevate the dog K and release the striking-train, which will then cause the hammer L to strike one blow on the arm $g$ of the spring rock-lever M, whose other arm, $h$, then strikes the arm $i$ of the agitator E, and thus communicates the desired vibration to the latter.

I may in some cases dispense with the intermediate device—to wit, the spring rock-lever M—and arrange the parts so that the hammer L will strike directly on the arm $i$ of the agitator.

The clock-train may be constructed so as to give a blow, and thereby agitate the plate E, each half-minute, or each minute, or at such other intervals of time as may be preferred.

I may also put a device, in place of the hammer, which shall shake or vibrate the agitator by pulling or pushing the same instead of striking it.

What I claim is—

1. The combination, substantially as described, of a receptacle for flies, having entrances at the bottom, and an alarm mechanism, consisting of an agitator located at the base of said receptacle, and a time and striking mechanism for imparting vibration to said agitator at suitable intervals, as specified.

2. The combination, substantially as described, of the agitator and fly-receptacle or prison-chamber, the clock or time and striking train, the trip-lever, the pinion on the shaft $c$, and the spring-dog of the striking-train, all as shown and described, to operate as specified.

3. The combination of the spring rock-lever with the time and striking mechanisms and the agitator and fly-receptacle, as specified.

4. The combination, with a fly-receptacle, of a suspended agitator adapted to be vibrated, substantially as and for the purpose described.

5. The combination of the annular agitator, the recessed bait-receptacle, and the fly-receptacle, as shown and described.

6. The combination of the agitator and the spring-support for the same and the fly-receptacle, as set forth.

WILLIAM SMITH.

Witnesses:
WILLIAM A. ST. JOHN,
THOMAS G. BARKER.